July 22, 1947.  F. L. PARS  2,424,328
VALVE
Filed Sept. 7, 1944

INVENTOR
Frank L. Pars
BY Benj. T. Rauber
ATTORNEY

UNITED STATES PATENT OFFICE 2,424,328

VALVE

Frank L. Pars, Brooklyn, N. Y.

Application September 7, 1944, Serial No. 553,087

1 Claim. (Cl. 251—92)

My invention relates to a valve in which the rate of passage or flow of a liquid or fluid therethrough may be very accurately and uniformly controlled from zero to full flow. This accuracy of control is attained in my invention with a minimum of moving parts.

In my invention the valve comprises a housing having a recess tapered at its bottom to a conical surface and a plug rotatable in this recess and having a conical surface fitting tight against the conical surface of the recess. The conical surface of the plug is resiliently pressed against that of the recess, as by a spring, to insure a tight contact. An inlet port opens through the conical surface of the recess in position to communicate with a groove on the conical surface of the plug which may be rotated to move the groove out of communication with the port and close the valve or to move it into communication with the port to provide a passageway that widens progressively and gradually from zero to a maximum as the plug is rotated. A duct through the plug leads from the groove to an outlet port of the housing.

The inlet and outlet ports of the recess are sealed from each other by the plug preferably by having the conical surfaces of the plug and recess lapped to a fluid-tight contact and having the plug spring pressed into the recess.

Figure 1:
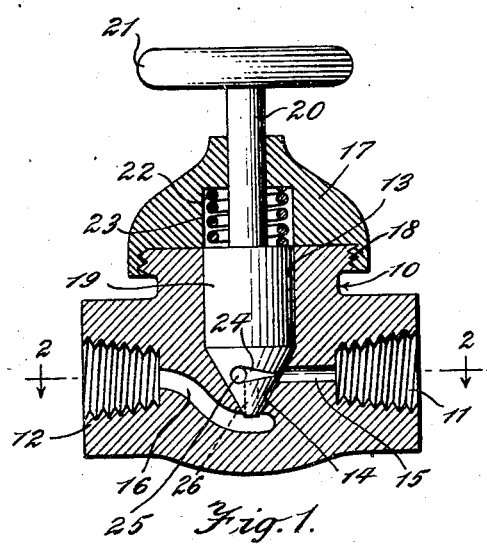
Figure 2:
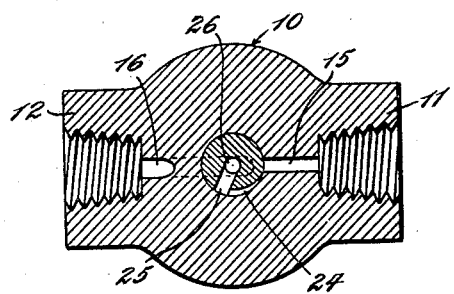

Various features of my invention are illustrated, by way of example, in the accompanying drawings in which Fig. 1 is a vertical section of a valve embodying a preferred form of the invention, and Fig. 2 is a horizontal section of the valve taken on line 2—2 of Fig. 1.

In the embodiment of the invention shown in the accompanying drawings a valve housing or casing 10 having an inlet nipple 11 and outlet nipple 12 is provided with a cylindrical recess 13 extending downwardly and having a tapered or conical lower end 14. An inlet port 15 extends from the inlet nipple 11 to the conical or tapered surface 14. An outlet duct or port 16 extends from the lower end or point of the conical surface to the outlet nipple 12. The housing is provided with a bonnet 17 which preferably screws onto a flange 18 of the housing to close the recess.

Mounted in the recess 13 and closely fitting the cylindrical and tapered or conical surfaces thereof is a rotatable plug 19 which closes direct communication between the ports 14 and 16. The plug 19 has an upwardly extending spindle 20 which passes through an opening in the bonnet 17 and is provided at its upper end with a handle 21 whereby the spindle and plug 19 may be rotated.

The plug 19 is pressed downwardly by a spring 22 bearing against the upper surface of the plug about the spindle 20 and confined in a recess 23 in the bonnet 17. The spring 22 presses the plug downwardly with sufficient force to bring the lower conical surface of the plug into a tight, preferably fluid-tight, contact with the conical surface 14 of the recess.

The conical surfaces of the plug and recess fit tightly in all positions of rotation of the plug and are preferably lapped to insure a tight contact so as to prevent any passage of fluid from the inlet port 15 between these surfaces to the outlet duct or port 16.

The plug 19 is provided in its conical or tapered surface with a groove 24 at such a height that it may communicate with the port 15 when turned to the proper angle relative thereto.

The groove 24 is preferably tapered so that as it is moved into communication with the port 15, as for example in turning counterclockwise in the position shown in Fig. 2, communication will first be through the very tip of the groove and, therefore, affording a minimum passageway. On further turning communication between the groove 24 and the port 15 widens until the maximum is provided. Fluid entering the groove 24 from the port 15 may then flow through a radial duct 25 to approximately the center of the plug and communicates with a downwardly extending duct 26 which opens into the outlet port or duct 16.

The passageways 25, 26 and 16 are equal to the maximum passage between the inlet port 15 and the groove 24 so that the size of the opening between the port 15 and the groove 24 will control the flow of fluid by having the groove 24 tapered. The increase in the passageway may be made very gradually and the widening of the groove or deepening of it may be such as to provide a proportionate flow for the rotation of the plug.

While a preferred form of groove has been illustrated, it will be understood that the shape of the groove may be varied provided that the area of the port that it overlaps progressively increases uniformly as the plug is turned or provides a passageway through the groove that enlarges progressively and uniformly with the turning of the plug.

It will be understood that while the port 15 has been described as an inlet port, and the port 16 as an outlet port, the direction of flow of the fluid may be reversed, 16 becoming the inlet port and 15 the outlet port.

What I claim is:

A valve comprising a housing having a recess with a cylindrical side wall and a conical surface tapering away from said cylindrical wall, an inlet duct opening on said conical surface and an outlet duct leading from its apex, a plug rotatable in said recess and having a cylindrical guide surface fitting the cylindrical surface of said recess and a conical surface complementary to the conical surface of said recess and in fluid-tight contact therewith, said plug having a groove in its conical surface movable into and out of registry with said inlet duct as said plug is rotated, said groove being constructed and arranged to variably throttle the inlet duct on rotation of said plug and a passage leading from said groove to said outlet duct, a bonnet covering said recess and plug, a stem extending from said plug through said bonnet and resilient means between said bonnet and said plug pressing on said plug to hold the conical surface of said plug in tight contact with the conical surface of said recess.

FRANK L. PARS.

REFERENCES CITED

The following references are of record in the file of this patent:

UNITED STATES PATENTS

| Number | Name | Date |
| --- | --- | --- |
| 2,170,619 | Sica | Aug. 22, 1939 |
| 919,753 | Ord | Apr. 27, 1909 |
| 1,928,442 | Whaley | Sept. 26, 1933 |
| 1,103,439 | Schultz | July 14, 1914 |

FOREIGN PATENTS

| Number | Country | Date |
| --- | --- | --- |
| 321,709 | Italy | 1934 |
| 400,099 | Germany | 1924 |